United States Patent [19]

Puckette

[11] Patent Number: 4,583,231
[45] Date of Patent: Apr. 15, 1986

[54] METHOD OF, AND APPARATUS FOR, FREQUENCY-HOPPED FREQUENCY-SHIFT-KEYED DIGITAL DATA COMMUNICATIONS

[75] Inventor: Charles M. Puckette, Scotia, N.Y.

[73] Assignee: General Electric Company, Schenectady, N.Y.

[21] Appl. No.: 548,060

[22] Filed: Nov. 2, 1983

[51] Int. Cl.⁴ .................... H04B 15/00; H04L 27/18
[52] U.S. Cl. ........................................ 375/1; 375/51
[58] Field of Search ................. 375/1, 45, 48, 51, 57

[56] References Cited

U.S. PATENT DOCUMENTS

| 4,355,399 | 10/1982 | Timor | 375/1 |
|---|---|---|---|
| 4,468,792 | 8/1984 | Baker et al. | 375/1 |

OTHER PUBLICATIONS

Ponnusamy et al., "Acquisition of FH PN Codes using Partial Correlation Coefficients," 1980.
Huth, "Spread Spectrum Techniques," Sep. 1978.
Merkel et al., "Micro Computer Application to a Spread Spectrum Frequency Hopping Modem," 1974.

Primary Examiner—Jin F. Ng
Assistant Examiner—Curtis Kuntz
Attorney, Agent, or Firm—Geoffrey H. Krauss; James C. Davis, Jr.; James Magee

[57] ABSTRACT

A digital data communications method and system combining frequency agility with a frequency-shift-keyed signal to transmit a unique code word representing a plurality of data states. Each code word comprises a plurality of chips, each of which is an integer subportion of the bit time interval in which one data bit is communicated. The multiple-chip word provides a frequency-hopped spread spectrum signal in which the nominal carrier frequency value is offset for transmitting binary data, or is offset in either frequency direction by different discrete amounts for transmitting multilevel digital data, to allow the data value to be properly decoded at a receiver even if the transmitter instantaneous frequency during at least one chip time interval is jammed by another signal. The frequency offset, can also be provided in complementary fashion during selected chip time intervals to even further encode the data bit being communicated and further reduce the probability of jamming. The multiple-chip code word, of normal or selected-chip-complemented form, modulates a carrier at the transmitter end. The FH-FSK carrier is demodulated at the receiver end by an inverse modulation process which converts the signal into a serial bit stream, for matched filtering transmission and reception apparatus of non-complemented and/or complemented chip-encoded words is described.

38 Claims, 9 Drawing Figures

METHOD OF, AND APPARATUS FOR, FREQUENCY-HOPPED FREQUENCY-SHIFT-KEYED DIGITAL DATA COMMUNICATIONS

BACKGROUND OF THE INVENTION

The present invention relates to data communications and, more particularly, to novel methods of, and apparatus for, communicating digital data over a medium having also at least one potentially-interfering signal present therein.

Modern digital data communications must often be propagated over a medium in which at least one potentially-interfering signal is present. For example, the transmission of digital data by a modulated carrier over the A.C. power line is often impossible, due to the presence of potentially-interfering signals at each harmonic of the line frequency (e.g. 60 Hz. in the United States). The magnitude of modulated carrier signal is limited, by governmental regulation, to a relatively low value, which is typically less than the magnitude of the substantially-CW harmonics of the power line waveform, even at frequencies several orders of magnitude greater than the power line fundamental frequency. It has been proposed to use frequency-hopping (FH) spread-spectrum techniques to overcome the presence of a relatively few potentially-interfering signals; however, the multiplicity of relatively close-spaced harmonics of the power line frequency severely limits the rate at which digital data can be transmitted in a power line carrier (PLC) FH system. It has also been proposed to use frequency-shift-keyed (FSK) modulation of a single carrier, preferably precisely positioned between power line frequency harmonics, to allow an increase in data rate; however, the power line frequency harmonic "noise" severely limits the reliability of systems using an FSK modulation approach. Therefore, it is highly desirable to provide a method of, and apparatus for, communicating digital data over a medium, such as a power line, having a plurality of potentially-interferring signals, and providing greater reliability than an FSK-modulated system and a greater data transmission rate than an FH system.

BRIEF SUMMARY OF THE INVENTION

In accordance with the present invention, a digital data communications method and system are realized by combining frequency agility with a frequency-shift-keyed modulated signal to transmit a unique code word representing each of a plurality of data states. The code word consists of a plurality of "chips", each having a chip time interval (CTI) which is an integer subportion of the bit time interval (BTI) in which one digital data bit is communicated. The multiple-chip code word provides a frequency-hopped spread spectrum signal in which the nominal carrier value is offset in one or another frequency direction for transmitting binary data, or is offset in either frequency direction by different discrete amounts for transmitting multilevel digital data, to allow the digital data value to be properly decoded at a receiver even if the transmitter instantaneous frequency during at least one chip time interval is jammed by another signal present on the communcations medium. The frequency offset, of the code word transmitted during the multiple-chip BTI, can be further provided in complementary fashion (inverted offset) during selected chip time intervals to even further encode the data bit being communicated and further reduce the probability of complete system jamming during that BTI.

The multiple-chip code word, of normal or selected-chip-complemented form, modulates a carrier at the transmitter end. The FH-FSK carrier is demodulated at the receiver end by an inverse modulation section which converts the signal into a serial bit stream, for introduction into a matched filter having characteristics defined by the particular multiple-chip code word utilized. In a binary data transmission system, if a code word which is not selected-chip-complemented is received, the matched filter provides maximum and minimum output, of a first polarity, for opposite binary data bit modulation. If a chip-complemented code word is received, the matched filter provides a maximum first polarity output for reception of a correctly-complemented coded word for a first binary data condition, and a maximum output of the opposite polarity responsive to reception of the correctly-complemented coded word for the remaining binary data condition. The matched filter means, being linearly modulated in discrete steps by the chip-time-coding employed at the transmitter end, provides a matched filter output amplitude which is proportional to the time when the code word is complemented.

In presently preferred embodiments, six chips per BTI are utilized, with a transmitter means which is single-switch-configurable for sending binary data in either the uncomplemented or a predetermined, selected-chip-complemented form. The receive means, forming part of a data station with an associated transmitter means at each location in a data communication system, includes frequency-conversion means utilizing a local-oscillator signal provided by the associated transmitter means, for conversion of each chip of the frequency-hopped, FSK signal to a common intermediate frequency, at which frequency demodulation occurs. The recovered chip data is acted on by a six-chip matched filter, and the filter output may be supplied, to fully recover the binary data value transmitted to the receiver means over the system media.

Accordingly, it is an object of the present invention to provide a novel method for communication of digital data over a medium having at least one potentially-interfering signal present therein.

It is another object of the present invention to provide novel apparatus for communication of digital data over a medium having a least one potentially-interfering signal present therein.

These and other objects of the present invention will become apparent upon consideration of the following detailed description, when read in conjunction with the drawings.

DETAILED DESCRIPTION OF THE INVENTION

Figure 1:
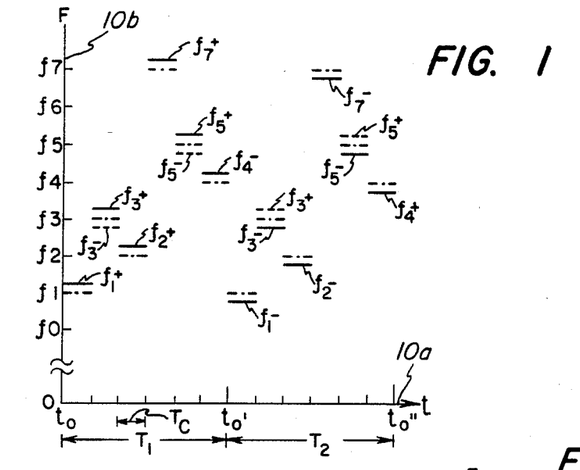
FIG. 1 is a frequency-time graph illustrating the frequency encoding of a six-chip code word, in both non-chip-complemented and chip-complemented form, for each of the digital values in a binary data communications system, in accordance with the method of the present invention.

Referring initially to FIG. 1, the method of the present invention is illustrated for a binary data system in which each data bit is transmitted during one of a plurality of sequential bit time intervals (BTIs) of essentially similar duration. FIG. 1 illustrates, along the time (t) axis 10a, a pair of sequential BTIs, i.e. first bit time interval $T_1$, from a starting time $t_0$ to an ending time $t_0'$, and a second bit time interval $T_2$, starting at the first bit time interval ending time $t_0'$ and ending at time $t_0''$. Illustratively, a binary 1 digital data signal will be transmitted during first bit time interval $t_1$ and a binary 0 digital data signal will be transmitted during the second bit time interval $t_2$.

In accordance with one principle of the present invention, each bit time interval is divided into an integer number of sequentially-occurring time "chips". The chips are advantageously of essentially equal duration. In the illustrated example, each bit time interval is broken into six chips, each having a chip time interval (CTI) of duration $T_C$. It should be understood that the number of chips per bit time interval need not be an even number, and that a greater number of chips per bit time interval decreases the probability of loss of the data bit to be transmitted during that BTI, but at the expense of requiring transmission apparatus capable of increased speed (for communication of data at the same rate) and requiring a careful analysis of the tradeoffs between the acceptable bit error rate and system cost.

During each CTI, a carrier waveform is transmitted at one of a plurality of different frequencies. Advantageously, the number N of the plurality of nominal frequencies will be equal to a power$^p$ of base 2, e.g. $N=2^P$, where P equals 3 and N equals 8 for the illustrated embodiment. It is desirable, although not necessary, that the separation between adjacent frequencies be substantially equal; it is absolutely necessary that the nominal frequencies be known, even if the spacing therebetween is not substantially constant. The illustrated eight frequencies, e.g. from lowest frequency $f_0$ through highest frequency $f_7$, are illustrated as having substantially equal spacing therebetween as graphed on the frequency F axis 10b of FIG. 1. By way of illustration only, if the lowest frequency $f_0$ is about 100 KHz. (and specifically about 99.99 KHz.) and the highest frequency $f_7$ is in the region of about 200 KHz. (and specifically about 204.99 KHz.) the separation between each of the eight carrier frequencies is about 15 KHz. and respective frequencies $f_1$, $f_2$, $f_3$, $f_4$, $f_5$ and $f_6$ are substantially at 114.99, 129.99, 144.99, 159.99, 174.99 and 189.99 KHz., respectively. The use of the particular illustrative frequencies was chosen to be an odd multiple of the first subharmonic (30 Hz.) of the power line frequency, such that each nominal frequency $f_0$–$f_7$ is substantially midway between the adjacent higher and lower power line frequency harmonics. During each time interval $T_C$, a different nominal frequency, shown in chain (-.-) line, is utilized. The exact nominal frequency sequence is such that a nominal frequency is not used more than once during each bit time interval, and that the chosen nominal frequency sequence is repeated during each subsequent bit time interval. Thus, as illustrated, the frequency subscript sequence 1-3-2-7-5-4 has been chosen; this sequence, as shown, is thus repeated in first bit time interval $T_1$, second bit time interval $T_2$ and all subsequent bit time intervals. By so selecting the chip frequency sequence, the probability of a potentially-interferring carrier in any portion of the spectrum region from about $f_0$ to about $f_7$ is minimized. In the illustrated embodiment of my method, repetition of the selected chip frequency sequence, in and of itself, does not convey data through the system, although it should be understood that, in a multi-data-level system, the nominal frequency chip sequence could be used to convey information for one selected level of a multiplicity thereof. Digital data is conveyed, in the general method embodiment, by offsetting the actual transmitted frequency in a predetermined manner from the nominal frequency selected for each of the C (e.g. C=6) chips of each bit time interval. In the illustrated binary data transmission system, the actual frequency is increased by an offset frequency $\Delta f$, added to each nominal frequency during a logic 1 data bit time interval, and is decreased by the same offset frequency $\Delta f$, from the nominal frequency, during each bit time interval, e.g. interval $T_2$, during which a binary 0 data bit is transmitted. In the illustrated example, the offset frequency $\Delta f$ is about 3.15 KHz. (also being an odd multiple of the first subharmonic of the power line frequency, so that even the actually-transmitted frequencies are at nulls between the power line harmonics).

Specifically, during the first chip of the first time interval $T_1$, during which the logic 1 bit is sent, the actual frequency $f_a$ is that frequency $f_1^+$ which is $\Delta f$ higher in frequency than the nominal $f_1$ frequency to be transmitted in that CTI; in the illustrated example, $f_1 + \times f_1 + \Delta f$ (about 118.14 KHz.). The actual frequencies transmitted during the second through sixth chips of the first bit time interval are respectively $f_3^+$ (about 148.14 KHz.), $f_2^+$ (about 133.14 KHz.), $f_7^+$ (about 208.14 KHz.), $f_5^+$ (about 178.14 KHz.) and $f_4^+$ (at about 163.14 KHz.), all as shown by the solid frequency lines. During the time interval $T_2$ when a binary 0 logic bit is sent, the negative frequency offset causes the actual frequencies transmitted in the sequential six chips thereof to be: $f_1^-$ (about 111.84 KHz.), $f_3$ (about 141.84 KHz.), $f_2^1$ (about 126.84 KHz.), $f_7$ (about 201.84 KHz.), $f_5^-$ (about 171.84 KHz.) and $f_4^-$ (about 156.84 KHz.).

It should be understood that other frequency offsets and other frequency spacing schemes can be equally as well utilized, such as setting the nominal $f_0$ frequency at about 100 KC and the upper $f_7$ frequency at about 200 KC with about 14.29 KC average spacing therebetween, and that the offset frequency $\Delta f$ can be less than or greater than the spacing between adjacent nominal frequencies, even if the nominal frequency-nominal frequency spacing is slightly less than 15 KHz. It should be understood that non-binary data values can be also transmitted, e.g. transmission of octal data (having eight different values) can be accomplished by assigning a total of eight different frequency offset $\Delta f$ combinations, each of which corresponds to one of the levels to be transmitted and which may be upon either the increasing-frequency or decreasing-frequency side of the nominal frequencies utilized. It should also be understood that a multivalue data transmission system need not be transmitting data in a system based on a power-of-2 numbering base, or that equal numbers of different offset frequencies above and below the nominal frequency need not utilized. Similarly, it should be understood that the nominal frequency can be utilized as one of the offsets in a system having a plurality of different data values to be transmitted, if desired. However, use of the nominal frequency for indicating one of the data values to be transmitted by the system will not allow the complemented-chip encoding method, to be described hereinbelow, to provide additional interference protection, for at least that one data value encoded by nominal frequency use. Thus, in general, where there are C chips per bit time interval and L discrete data levels capable of transmission, there will be a total $F_a$ of actually transmitted frequencies equal to the $(C)\times(L)$ product; in the illustrated binary (L=2) and six-chip (C=6) system, $F_a=6\times 2=12$ actually frequencies ($f_1-$, $f_1+$, $f_2-$, $f_2+$, $f_3-$, $f_3+$, $f_4-$, $f_4+$, $f_5-$, $f_5+$, $f_7-$ and $f_7+$, respectively). The chances of having potentially-interfering carriers at each of this multiplicity of frequencies has a relatively low probability, assuring that the chip-encoded pattern for one or the other level is recognized at the receiving end, even if several, but less than all, of the encoded chips are "jammed".

The probability of recognizing the chip-encoded bit can be even further increased by selectively frequency complementing the actual frequency transmitted during selected ones of the C chips per bit time interval. In the illustrated example, the selected complemented chip actual frequencies are shown by broken (- - -) lines. Illustratively, the second and fifth chips in each bit time interval are transmitted in complementary fashion, whereby the offset frequency direction is deliberately reversed in those chip time intervals. Thus, the normal increased-frequency offset is utilized in the first, third, fourth and sixth chip time intervals for a logic 1 bit transmission and the normal decreased-frequency offset is utilized in the first, third, fourth and sixth chips of a binary 0 bit time interval, but the second and fifth chip actual frequencies are transmitted with opposite-frequency offsets in the second and fifth time intervals, e.g. actual frequencies of $f_3-$ and $f_5-$ in the respective second and fifth chips of a binary 1 bit time interval complementary-encoded transmission and actual frequencies of $f_3+$ and $f_5+$ in the respective second and fifth chips of a binary 0 bit time interval complementary-encoded transmission.

At the receiving end, the chip frequencies, in either the encoded chip or the encoded-complementary-chip versions of the present method, are heterodyned against a local oscillator having the frequency thereof varied in the same sequence as the nominal frequency sequence utilized, and having an actual frequency offset from the nominal frequency, during each chip, by the frequency ($f_{if}$) of the intermediate-frequency section of that receiver means. Thus, while not specifically shown in FIG. 1, for reasons of simplicity, the local oscillator in a heterodyne receiver for receiving the chip signals of the present invention, might be offset above or below the sequenced nominal frequencies by the intermediate frequency; and would thus have a local oscillator frequency $f_{LO}$, during the respective six chips, of ($f_1\pm f_{if}$), ($f_3\pm f_{if}$), ($f_2\pm f_{if}$), ($f_7\pm f_{if}$), ($f_5\pm f_{if}$) and ($f_4\pm f_{if}$) with the 1-3-2-7-5-4 frequency scanning sequence of the illustrated embodiment. The intermediate frequency is added to the nominal chip frequency for a high-side local oscillator frequency $f_{LO}$ and is subtracted from the nominal frequency for a low-side local oscillator frequency $F_{LO}$.

Figures 1A, 3A:
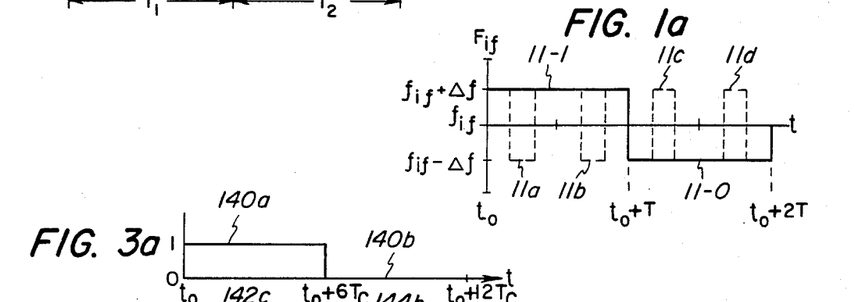
FIG. 1a is a frequency-time graph illustrating the frequency relationships in an intermediate-frequency portion, of a receiver utilizing the apparatus and methods of the present invention.
FIGS. 3a–3e are a set of time-related graphs illustrating the signals present at various points in the receiver means of FIG. 3 and useful in understanding the principles and operation thereof.

FIG. 1a illustrates the actual frequencies, with respect to time t, present in the intermediate frequency portion of the receiving end means. The actual intermediate frequency $F_{if}$ is, for low-side local oscillator injection, at a substantially constant frequency ($f_{if}+\Delta f$) for all six chips of a non-complementary-encoded, binary 1 level transmission, during the bit time interval T from start time $t_0$ to end time $t_0+T$, and is at a different frequency ($f_{if}-\Delta f$), less than the nominal if frequency $f_{if}$, during the second bit time interval, from time $t_0+T$ to time $t_0+2T$, for all six chips of a nonencoded, binary 0 data bit transmission. Similarly, if a 2,5 chip-inversion complementary-encoding method is used, with low-side local-oscillator injection, the intermediate-frequency instantaneous values will decrease to the lower value ($f_{if}-\Delta F$) during portions 11a and 11b, corresponding to the decreased-frequency-offset second and fifth chips of a binary 1 data bit transmission, and will increase to the higher value ($f_{if}+\Delta f$) during portions 11c and 11d, corresponding to the increased-frequency offsets second and fifth chips of a binary 0 data bit transmission. The receiving end also comprises means for frequency-detecting and for recognizing the particular chip encodation, selected for use in the system, by coherent summation and thresholding of the demodulated signal.

Figure 2:
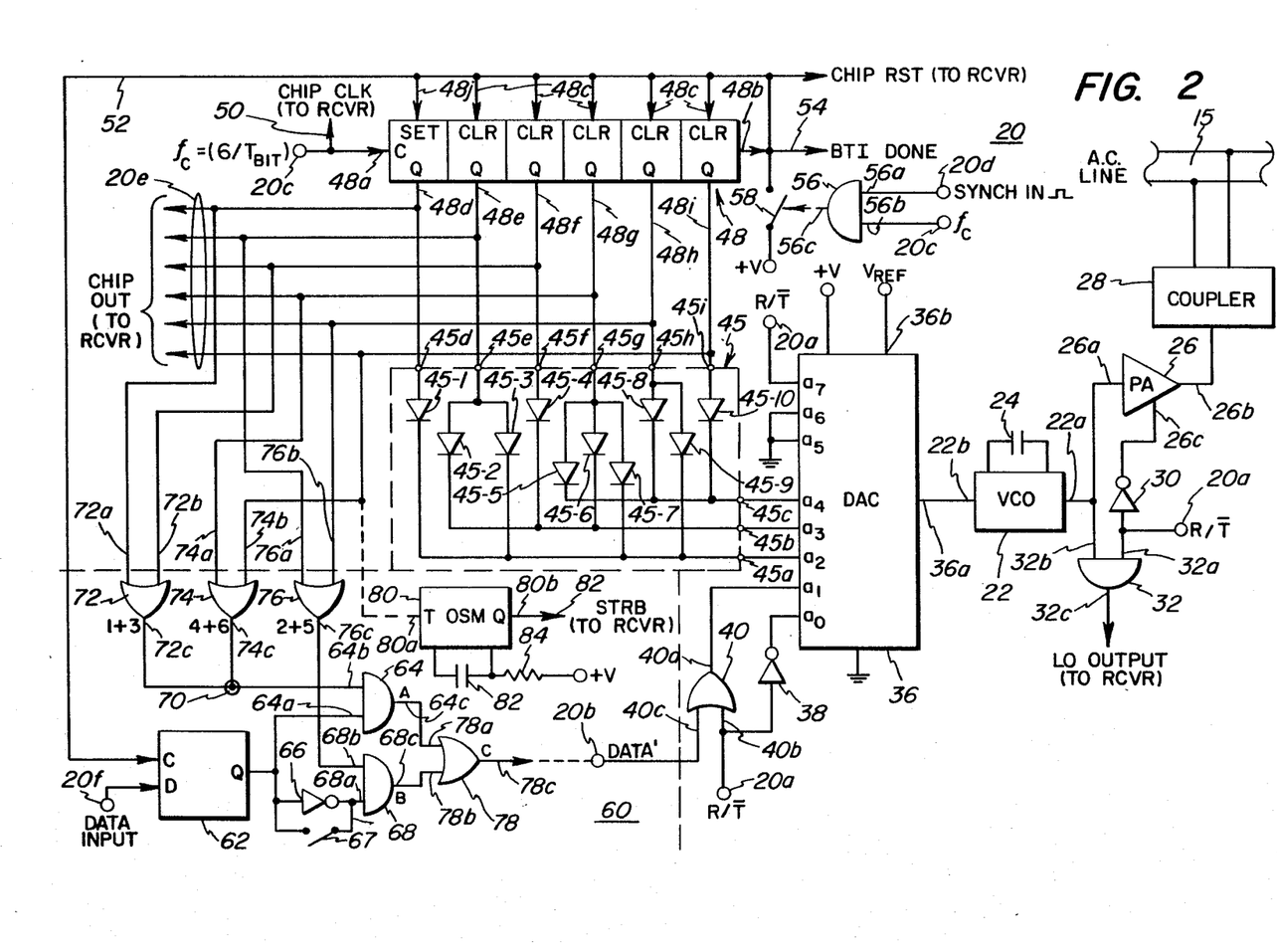
FIG. 2 is a schematic block diagram of transmitting means for generating a binary data bit FH-FSK code word, with six-chips and chip-complemented form, over a power line transmission medium.

Referring now to FIG. 2, a schematic block diagram is shown for a presently preferred means 20 for transmitting a chip-encoded frequency-hopped and frequency-shift-keyed (FH-FSK) signal with either normal uncomplemented or selected-chip-complemented form. Transmitter 20 utilizes a voltage-controlled oscillator (VCO) means 22, having an associated frequency-band-determining capacitive element 24, for generating a particular frequency at the VCO means output 22a responsive to the magnitude of a D.C. voltage at a VCO means control input 22b. The controlled-frequency output is coupled to the signal input 26a of a power amplifier (PA) means 26 and appears with amplified magnitude at the output 26b thereof, if a control signal at a control input 26c is enabled. The amplified signal at PA means output 26b is coupled via coupler means 28 onto the system transmission medium, such as the A.C. power line 15 and the like. The PA control means input 26c receives its control signal from the output of an inverter 30 receiving a R/$\overline{T}$ receive-transmit control signal at the input thereof from a first transmitter input 20a. The receive-transmit signal at terminal 20a is also coupled to one input 32a of a first two-input AND gate 32, which receives the variable frequency VCO means output 22a signal at the second input 32b thereof. The first AND gate output 32c provides the local oscillator (LO) output to the receiver means (of FIG. 3, described hereinbelow), responsive to the signal at transmitter input 20a being at the high (logic 1) receive R level, and disables the LO gate output 32c for a low (logic 0) transmit $\overline{T}$ level at input 20a.

The frequency-control voltage at VCO means input 22b is provided at the analog voltage output 36a of a digital-to-analog converter (DAC) means 36. DAC means 36 receives an operating potential +V, as do all other logic and active components of transmitter means 20, and also receives an essentially-constant-magnitude reference voltage $V_{REF}$, at a reference input 36b, with both voltages being with respect to circuit common potential. The reference voltage is generated by means well known to the art. DAC means 36 is an M-digital bit input unit, where M=8 in the illustrated embodiment. The eight DAC means input lines $a_0$-$a_7$ control the magnitude of analog voltage at output 36a and hence the frequency of VCO means 22. Illustratively, for an offset frequency $\Delta f$ of 3.125 KHz. and an intermediate-frequency receiver means center frequency of 300 KHz., the most significant bit (MSB) input line $a_7$ is connected directly to the receive-transmit input terminal 20a, while the least-significant. bit (LSB) input $a_0$ is connected through a second logic inverter 38 to transmitter input means receive-transmit terminal 20a. The second and third most-significant-bit inputs $a_6$ and $a_5$ are both connected to receive a low (logic 0) level, i.e. by connection to ground potential. The next-least-significant-bit input $a_1$ is connected to the output 40a of a first two-input OR gate 40, having a first input 40b connected to the receive-transmit selection input terminal 20a and having a remaining input 40c connected to a transmit-data DATA' input terminal 20b. DAC means inputs $a_2$-$a_4$ are each respectively connected to an associated one of first, second or third outputs 45a-45c, respectively, of a chip-coding matrix means 45.

Frequency-chip-encoding matrix means 45 includes C input terminals, each sequentially associated with one of the C sequential chips to be transmitted in each BTI. In the illustrated embodiment, where C=6, six inputs 45d-45i are utilized. Each input 45d-45i is connected to the one associated output 48d-48i of a C-stage shift register means 48. The illustrative C=6 stage shift register means 48 has a clock C input 48a receiving a chip clock waveform, at a clock frequency $f_c$ equal to (C/T), provided at a chip clock input 20c of transmitter means 20. In the illustrative embodiment, $f_c = (6/T_{BIT})$, wherein $T_{BIT}$ is the bit time interval $T=T_1=T_2$ of FIG. 1. The chip clock frequency waveform received at input terminal 20c is also provided via a connection 50 to a receiver means chip clock input terminal 50' (to be described hereinbelow with respect to FIG. 3). An output 48b from the last serial register stage is connected to a chip reset (RST) line 52 (also coupled to a chip reset input terminal 52' of the receiving means described hereinbelow), and to a completed bit time interval (BTI DONE) line 54. Only one of the C=6 stage Q outputs 48d-48i is enabled to a logic 1 level during the corresponding C-th chip of each BTI, with the remainder of the Q stage outputs being disabled to the logic 0 level at all other times. The sequential transfer of the logic 1 level at the appropriate Q sequential output is accomplished at the chip clock $f_c$ frequency, responsive to the waveform at clock input 48a; to assure proper starting and sequencing, each of the second through C-th stages of the shift register are cleared, by the connection of their clear (CLR) inputs 48c to the chip RST bus 52, and the first stage output is set by connection of the first stage SET input 48j to that bus. As required for proper synchronization, a two-input AND gate 56 may receive a synchronizing input pulse at an auxiliary transmitter means input terminal 20d, for application to a first input 56a thereof, and receives the chip clock $f_c$ waveform at the second input 56b thereof; the gate output 56c may be utilized to close a first switch means 58 (coupled between operating potential +V and a wired-OR connection with shift register output 48b) to impose an initial logic 1 synchronizing signal on bus 52, which will set the first stage Q output 48d to a logic 1 level and will clear the second through C-th stage Q outputs 48d-48i to the logic 0 level. It should be understood that many other means are known to the art for providing this synchronizing function. In addition to each stage output 48d-48i of the shift register being coupled to the one associated chip-encoding means input 45d-45i, each of the shift register outputs are provided at a transmitter output port 20e, for use in the companion receiver means, at the same location, if and as required.

Frequency-chip-encoding matrix means 45 translates the enablement of one input 45d-45i thereof, during each chip interval, into a three-bit frequency-selection code, available at outputs 45a-45c. For output 45a having a value of $2^0=1$, output 45b having a value of $2^1=2$ and output 45c having a value of $2^2=4$, the 1-3-2-7-5-4 illustrative chip encoding is provided by connection of: a first diode 45-1 with its anode at input 45d and cathode at output 45a (to encode a frequency $f_1$ chip); a pair of diodes 45-2 and 45-3 each having their anode connected to second input 45e and one of the cathodes connected to output 45a and one of the cathodes connected to output 45b (to encode a frequency $f_3$ chip); a fourth diode 45-4 connected between third input 45f and second output 45b (to encode a frequency $f_2$ chip); three diodes 45-5, 45-6 and 45-7, each having their anode connected to fourth input 45g and respectively having one cathode thereof connected to each of outputs 45a-45c (to encode a frequency $f_7$ chip); a pair of diodes 45-8 and 45-9, each having their anodes connected to fifth input 45h and respectively having a cathode connected to a different one of first and third output lines 45-a and 45-c (to encode a fifth frequency $f_5$ chip); and a final diode 45-10 having its anode connected to sixth input 45-i and its cathode connected to third output 45-c (to encode a frequency $f_4$ chip).

If non-selected-chip-complemented encoding is utilized, the binary data may be provided directly at data input 20b for transmission. When selected-chip-complemented encoding is utilized, an additional transmitter means section 60 is required. Transmitter means section 60 accepts the binary data input at a transmitter terminal 20f, for introduction to the data D input of a D-type flip-flop logic element 62, having the clock C input thereof connected to the chip RST reset line 52. The Q output of flip-flop 62 is connected to a first input 64a of a two-input AND gate 64, and through a logic inverter 66 to a first input 68a of another two-input AND gate 68. A second switch means 67 may be utilized to defeat the inverting action of inverter 66, for a purpose to be described hereinbelow. The second input 64b of gate 64 is connected to a wired-OR junction 70 formed at the connected outputs 72c and 74c of first and second two-input OR gates 72 and 74. A first gate first input 72a receives the first chip select signal from the shift register first stage Q output 48d, while the remaining input 72b receives the third chip select output from the third shift register third stage Q output 48f. A first input 74a of the second OR gate 74 receives the fourth chip select output from the shift register fourth stage Q output 48g while the remaining input 74b of that gate receives the sixth chip select output from the shift register sixth stage Q output 48i, for the illustrative selected-chip-complemented 2,5 coding. A third OR gate 76 has its output 76c connected to the remaining input 68b of AND gate 68. The first input 76a of this OR gate is connected to shift register second stage Q output 48e for receiving the second chip select signal, while the remaining input 76b is connected to the shift register fifth stage Q output 48h for receiving the fifth chip select signal. Thus, the first OR gate output 72c is at a logic 1 level if either the first or third chips are enabled, the second OR gate output 74c is at a logic 1 level if the fourth or sixth frequency chips are enabled and the third OR gate output 76c is at a logic 1 level if the second or fifth frequency-select chips are enabled. The first AND gate output 64c provides a logic A signal thereat to the first input 78a of another two-input OR gate 78, where $A = D \cdot (1+3+4+6)$, where D is the binary data bit state at data input 20f. The output 68c of the second AND gate provides a logic B signal to the second input 78b, where $B = \overline{D} \cdot (2+5)$. The output 78c of OR gate 78 provides a logic C signal for introduction to the DATA' terminal 20b of the transmitter means, where $C = D \cdot (1+3+4+6) + \overline{D} \cdot (2+5)$. Expanding the logic C terms, $C = (D \cdot 1) + (\overline{D} \cdot 2) + (D \cdot 3) + (D \cdot 4) + (\overline{D} \cdot 5) + (D \cdot 6)$, so that the bit data state D is sent in true form during the first, third, fourth and sixth chips and is complemented during the second and fifth chips of each bit time interval, as required in the illustrated embodiment. Means 60 may also include a monostable, one-shot, multivibrator OSM means 80, having its trigger input 80a connected to the sixth chip enablement line from the Q shift register output 48i, and an output 80b providing a strobe STRB signal on line 82 to the receiver (as to receiver input 82' of FIG. 3) with a strobe pulse timing duration determined by the magnitude of a timing capacitance 82 and a timing resistance 84 connected to OSM means 80.

In operation, transmission of a six-chip per binary data bit, selected-chip-complemented code word occurs as follows: the receive-transmit input 20a is at a logic 0 ($\overline{T}$) level, whereby PA control input 26c receives a logic 1 enabling level and LO gate 32 is disabled. Most-significant-bit input line $a_7$ of DAC means 36 is at a logic -0 level, as are input bit lines $a_6$ and $a_5'$ and least-significant-bit input $a_0$ is at a logic 1 level. The logic 0 $\overline{T}$ level at gate input 40b enables OR gate 40 for transmission therethrough of the binary data state at the DATA' input 20b, which is now the output 78c of transmitter section 60.

If the shift register 48 is not synchronized, the SYNCH. IN pulse is applied at input 20d at the beginning of the transmission and, while the chip clock is at a high level, during a first chip clock cycle, gate 56 closes first switching means 58 to place a high logic 1 level on chip reset line 52, setting the first stage Q output 48d to a logic 1 level and clearing the second through sixth stage Q outputs 48e–48i to a logic 0 level. Responsive to the high logic level at output 48d only, frequency selection matrix means 45 diode 45-1 conducts and DAC means input $a_2$ is at a logic 1 level; inputs $a_3$ and $a_4$ remain at their normal logic 0 levels (provided by internal or external pull-down resistors, not shown). Also responsive to the logic 1 level at shift register output 48d, the OR gate output 72c is at a logic 1 level, which level is applied to AND gate input 64b. The third OR gate output 76c is at a logic 0 level, as both shift register outputs 48e and 48h are at logic 0 levels, applying a logic 0 level to second AND gate input 68b. The logic 1 level forced onto bus 52 by the pulse closure of switch means 58 appears at the flip-flop 62 clock C input and transmits the first binary data state, presented at data input 20f (and assumed to be a logic 1 state at this point) to the flip-flop Q output, and therefore to the remaining input 64a of first AND gate 64. The logic 1 level at the Q output is inverted to a logic 0 level at the input 68a of the other AND gate 68. As both inputs of gate 64 are at logic 1 levels, the output signal A thereof is at a logic 1 level, while the output signal B of the other gate 68 is at a logic 0 level. The logic 1 level at one of the inputs of gate 78 is transmitted therethrough and the C, or DATA', signal is a logic 1 level, which is transmitted through gate 40 and appears as a logic 1 level at DAC means input $a_1$. This produces a total DAC means input $a_7$–$a_0$ binary bit pattern of 00000111 or a decimal 7 input); the corresponding voltage at output 36a and VCO means input 22b will, if the $V_{REF}$ voltage and the VCO means has been preset for transmission of a 100.000 KHz. carrier for an input of binary 00000000 (decimal 0) and a 200.000 KHz. output frequency for a binary input of 00100000 (decimal 32), produce a decimal-7 output voltage, corresponding to $f_1+$ (of about 121.875 KHz.) during the first CTI of a logic 1 BTI. This output frequency is amplified and coupled to the system media 15 for transmission to a receiving means at another location.

The chip clock signal at input 20c falls to a low logic value and then provides a second chip clock cycle. Responsive to the rising edge at the shift register clock C input 48a, the second counter stage Q output 48e is enabled and the first counter stage output 48d is disabled. During this second CTI, diodes 45-2 and 45-3 conduct, placing logic 1 levels at the DAC means $a_2$ and $a_3$ inputs and placing a logic 0 level at the $a_4$ input. The output of both OR gates 72 and 74 fall to a logic 0 level while the output of OR gate 76 rises to a logic 1 level. As a logic 0 level is now present on bus 52, flip-flop 62 is not clocked and the logic 1 binary data bit level is still present at the Q output thereof. Thus, both AND gates 64 and 68 have a logic 0 present at one input and a logic 1 present at the other input, whereby the signals A and B at both logic 0 outputs, and the OR gate signal C is also a logic 0 level. This logic 0 level is provided on the DATA' line to gate 40, to provide a logic 0 level at the $a_1$ input of DAC means 36. Responsive thereto, the DAC means inputs receive a binary 00001101 = decimal 13 data word, providing the necessary analog voltage at output 36a for transmission of the second chip at $f_3$− (about 140.625 KHz.), which is the complemented-chip frequency for the second CTI of this BTI.

Responsive to the next three chip clock cycles received at input 20c, the logic 1 level moves respectively to the third, fourth or fifth shift register Q outputs 48f, 48g or 48h. Simultaneously therewith, diode 45-4 conducts, or diodes 45-5 through 45-7 conduct, or diodes 45-8 and 45-9 conduct. At the same time, the output of gate 72, or the output of gate 74, or the output of gate 76, respectively, are set a logic 1 level, while the logic 1 level at the Q output of flip-flop 62 does not change. Therefore, the $a_1$ line to DAC means is at the respective logic 1, logic 1 and the logic 0 levels for the third, fourth or fifth CTIs of this first BTI. Responsive thereto, the DAC means input lines have, respectively, a binary 00001011 = decimal 11 count for an output frequency of $f_2+$ (about 134.375 KHz.) during the third CTI, or a binary 00011111 = decimal 31 count for an output frequency of $f_7+$ (about 196.875 KHz.) during the fourth CTI; or a binary 00010101 = decimal 21 count for an output frequency $f_5−$ (of about 165.675 KHz.), which transmits the second chip-complemented bit during the fifth CTI of this first BTI. Responsive to the sixth chip clock rising edge, the last register stage Q output 48i is enabled (and all previous shift register stage Q outputs 48d-48a are disabled to the logic 0 level); diode 45-10 conducts and provides a logic 1 level at DAC means input $a_4$, while inputs $a_3$ and $a_2$ are at logic 0 levels. Gate 74 transmits the logic 1 level to gate input 64, causing logic signals A and C to be at logic 1 levels and a logic 1 level to appear at the $a_1$ input of DAC means 36. The eight-bit input pattern is now a binary 00010011 = decimal 19 count, for transmission at frequency $f_4+$ (about 159.375 KHz.) in the sixth and final CTI of this first BTI. Responsive to the next chip clock pulse leading edge, the logic 1 level moves out of the last shift register stage and appears at output 48b and is propagated down bus 52 to reset the shift register stage Q outputs 48e-48i to the logic 0 level and set the first stage Q output 48d back to the logic 1 level. The logic 1 level at output 48b also accomplishes two other tasks: the BTI DONE line 54 is enabled, indicating that the first bit time interval is done and that a next bit time interval is about to start with transmission of a next-subsequent bit of binary data being transmitted; and the clock C input of flip-flop 62 receives another positive-going leading edge to allow the next bit of binary data provided at input 20f to be clocked through to the Q output of the flip-flop. As the operation for a binary 1 data bit has been explained hereinabove, it is assumed, for purposes of illustration and explanation, that the second binary bit is a logic 0 bit. Therefore, the flip-flop Q output is at a logic 0 level for the next six chips. The logic 0 level appears at gate input 64a, assuring that the logic function A will be a logic 0 for all six chips of the second BTI, but is inverted and appears at a logic 1 level at gate input 68a; therefore, the logic output function B of this gate can attain the logic 1 level if the output of gate 76 is at the logic 1 level, responsive to the second or fifth chips being transmitted. Only when the second or fifth (complemented) chips are transmitted will logic function C be at a logic 1 level, providing a logic 1 level through gate 40 to the $a_1$ input of DAC means 36. Input $a_1$ will receive a logic 0 level for the first, third, fourth and sixth chips. As for the six CTIs of the first BTI, the six chip clock cycles (corresponding to the second BTI) cause the shift register outputs 48d-48i to be sequentially and singly enabled, in fashion similar to that explained hereinabove. During the first CTI of the second BTI, the DAC means 36 binary input is 00000101 = decimal 5, for transmission of frequency $f_1-$ (about 115.65 KHz.). During the second CTI, the DAC means input count is binary 00001111 = decimal 15, for transmission of frequency $f_3+$ (at about 146.875 KHz.), which is the complemented second chip frequency for a logic 0 bit. Similarly, during the third through sixth chips, the DAC means inputs receive binary 00001001, binary 0001101, binary 00010111, and binary 00010001 input sequences, respectively corresponding to decimal 9, decimal 29, decimal 23 and decimal 17 counts, and respectively causing transmission of the third chip, logic 0 normal $f_2-$ frequency (about 128.125 KHz.), the fourth chip, logic 0 normal $f_7-$ frequency (of about 190.625 KHz.), the fifth chip logic 0 complemented frequency $f_5+$ (about 171.875 KHz.) and the sixth chip logic normal frequency $f_4-$ frequency (about 153.125 KHz.). At the end of the sixth clock cycle for the second BTI, the next chip clock pulse clears the second through sixth register stage Q outputs 48e-48i to the logic 0 level by enabling the counter output 48b to the logic 1 level, again providing a BTI DONE logic 1 level on line 54 and a logic 1 level on the chip RST bus 52. The latter also resets the first shift register Q output 48d to a logic 1 level for the first chip of the third BTI and also provides a next data-bit-clocking edge to the clock C input of flip-flop 62.

It will be seen that multivibrator 80 provides a strobe STRB pulse every time the sixth chip occurs. It will also be seen that if inverter 66 is of the open-collector variety, second switch means 67 may be closed and cause logic function B to be modified such that $B = D \cdot (2+5)$, whereby the selected-chip-complemented form is defeated and the multiple-chip-word is sent in normal, uncomplemented form. Thus, by the addition of flip-flop 62, inverter 66, switch 67 and gates 64, 68, 72, 74, 76 and 78, section 60 adapts the transmitter for chip-complemented or uncomplemented switch-selectable transmission.

Figure 3:
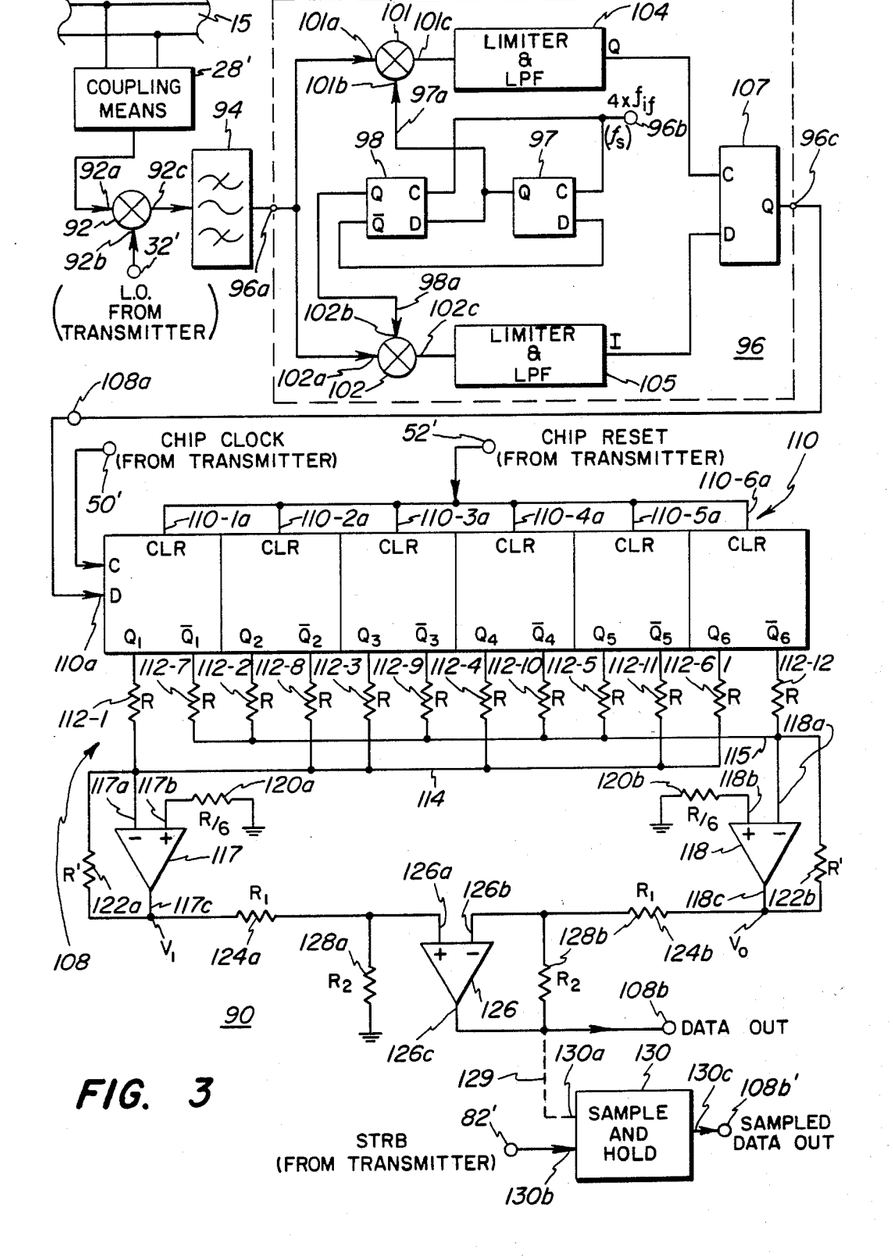
FIG. 3 is a schematic block diagram of receiving means for recovering the chip-complemented six-chip per data bit FH-FSK signal transmitted by the transmitter of FIG. 2.

It will be observed that if the receive-transmit input 20a receives a logic 1 level, for the receive R function, the power amplifier control input 26c receives a logic 0 level, turning off the transmitter amplifier means, while gate 32 is enabled to provide the VCO means output to the LO input 32' of the receiver means of FIG. 3. A received logic 1 level at input 20a also causes the $a_7$ and $a_1$ bits of DAC means 36 to each receive a logic 1 level and the $a_0$ DAC input to receive a logic 0 level.

Transmitter 20 is designed to generate an LO output which is on the higher-frequency side, of the received signal, whereby the intermediate-frequency waveforms of FIG. 1a would be rotated about the time t axis and would be the mirror image of the waveform shown in FIG. 1a, for the particular preferred system embodiment. Thus, as the logic 1 level circulates through shift register 48 during each BTI, the binary/decimal-equivalent counts at the DAC means input $a_7-a_0$ are as shown in the following table, with the equivalent local oscillator output frequencies:

| CTI | DAC Count-BINARY | DAC Count-DECIMAL | LOCAL OSCILLATOR FREQUENCY |
| --- | --- | --- | --- |
| 1 | 10000110 | 134 | $f_{LO,1}$ (about 418.75 KHz.) |
| 2 | 10001110 | 142 | $f_{LO,3}$ (about 437.50 KHz.) |
| 3 | 10001010 | 138 | $f_{LO,2}$ (about 431.25 KHz.) |
| 4 | 10011110 | 156 | $f_{LO,7}$ (about 462.50 KHz.) |
| 5 | 10010110 | 150 | $f_{LO,5}$ (about 450.00 KHz.) |
| 6 | 10011010 | 146 | $f_{LO,4}$ (about 443.75 KHz.) |

It should be noted that gate 40 acts to remove data modulation from the chip L.0. frequency, so that the same L.0. frequency is provided even if data levels at input 20b or 20f change during a receive interval. A comparison of the LO frequencies and transmitted frequencies will show that the intermediate frequency $f_{if}$ is about 300.00 KHz. with the actual frequency within the IF bandpass shifting between an upper frequency $(F_{if} + \Delta f) = 303.125$ KHz. when the transmitter outputs a frequency $f_n-$, where $0 \leq n \leq 7$, and a lower frequency $(f_{if} - \Delta f) = 296.875$ KHz. when the transmitter outputs a frequency $f_n+$.

FIG. 3 is the schematic block diagram of a companion receiver means 90 for use with the transmitter means 20 of FIG. 2 to form a digital data communications station. Receiver means 90 receives its local oscillator signal at input 32' (from the output of gate 32 in FIG. 2), receives the chip clock frequency signal at input 50' (from the output 50 of the transmitter of FIG. 2), receives the chip reset signal at input 52' (from bus 52 of the transmitter of FIG. 2), and receives the strobe STRB signal at input 82' (from output 82 of the transmitter of FIG. 2). It should be understood that each location, or a multiplicity of locations connected to the common transmission media 15, includes a transmitter means 20 and a companion receiver means 90, with the transmitter means at any particular location transmitting to the remaining locations and, if desired for the particular protocol utilized, having the transmitting location digital data transmissions also received at its own receiver means 90 for any necessary purposes.

Receiving means 90 includes a coupling means 28', possibly identical to the coupler 28 of transmitter 20, for coupling the carrier signal from the transmission medium 15 (e.g. the A.C. power line) to the signal input 92a of a frequency-mixing means 92. Mixer 92 has a second input 92b receiving the local oscillator frequency from terminal 32' (and hence from the VCO means 22 of the transmitter). The output 92c of the mixer has the signal, local oscillator and signal-local oscillator sum and difference frequencies present thereat. A bandpass filter means 94 selects the desired sum or difference frequency, e.g. the difference frequency in the illustrated embodiment, and rejects the other mixer product, input and local oscillator frequencies, to provide an intermediate-frequency (I-F) signal to the input 96a of a frequency-shift-keyed demodulator means 96. It will be seen that, as the local oscillator is frequency-hopped in synchronism with the frequency-hopped FSK signal during each of the plurality of chips in each bit time interval, the nominal intermediate frequency and the deviations therefrom (by $\pm \Delta f$) must fall within the bandpass of filter 94.

The FSK demodulator means 96 is substantially similar to that described and claimed in my copending application Ser. No. 409,237, filed Aug. 18, 1982 now U.S. Pat. No. 4,475,219, issued Oct. 2, 1984, assigned to the assignee of the present application and incorporated herein in its entirety by reference. Briefly, an oscillator means (not shown) applies a signal at a frequency $f_s$ which is four times the IF frequency ($f_S=4 \times (f_{if})$), at demodulator means input terminal 96b. A pair of D-type flip-flop logic elements 97 and 98 are configured to not only divide the frequency $f_S$ by a factor of 4, but also provide a 90° phase shift between a pair of signals, respectively at outputs 97a and 98a. The IF signal is applied in parallel to first inputs 101a and 102a of a pair of frequency-mixer means 101 and 102, respectively, each of which also receives one of the identical-frequency, phase-quadrature local oscillator signals from outputs 97a or 98a respectively at inputs 101b or 102b. Each of the mixer outputs 101c or 102c is each connected to the input of an asscoiated one of substantially identical limiter and low-pass filtering means 104 and 105. The output of means 104 is a first Q signal, applied to the clock C input of a third flip-flop logic element 107, while the output of second means 105 is another I signal applied to the data D input of the flip-flop 107, at the Q output of which is provided the demodulated chip-by-chip data. The demodulated chip data at the demodulator means output 96c is coupled to the data input 108a of a matched-filter means 108.

Input 108 is connected to the data input 110a of a C-stage serial shift register 110. For the illustrated C=6 chip embodiment, shift register 110 comprises six serial stages, each having a clear CLR input 110-1a through 110-6a. The chip clock signal at input 52' is applied to the clock C input 110b of the serial shift register.

The uncomplemented Q and complemented $\overline{Q}$ outputs of each shift register stage are connected through one of a plurality 2C of equal value resistances 112-1 through 112-12, to one of a pair of current-summing buses 114 and 115. The connection of a particular uncomplemented Q output or a particular complemented $\overline{Q}$ output from a particular stage to the positive summing bus 114 or the negative summing bus 115 is determined by whether the corresponding chip is transmitted in uncomplemented or complemented form. Thus, if an uncomplemented six-chip per BTI code is utilized, all of the uncomplemented Q outputs (e.g. outputs $Q_1$-$Q_6$) would be connected through their associated resistors 112-1 through 112-6 to bus 114 and all of the complemented $\overline{Q}$ outputs (e.g. outputs $\overline{Q}_1$-$\overline{Q}_6$) would be connected through their associated resistors 112-1 through 112-6 to bus 114 and all of the complemented $\overline{Q}$ outputs (e.g. outputs $\overline{Q}_1$-$\overline{Q}_6$) would be connected through their associated resistors 112-7 through 112-12 to bus 115. As each of the C chips is received and correctly demodulated, C chips of data (all at one of the logic 1 or logic 0 levels, if no interference has jammed a particular chip) move through the register. The input D data than has the form shown in FIG. 3a, i.e. a logic 1 level for all C=6 chips for a logic 1 binary data bit transmission in a first BTI (from time $t_0$ to time $t_0+6T_c$), and a logic 0 level for all C=6 chips for a logic 0 binary data bit transmission in a second BTI (from time ($t_0+6T_c$) to time ($t_0+12T_c$)).

In the illustrated embodiment, wherein the second and fifth chips are transmitted in complementary form during each BTI, the complemented $\overline{Q}$ outputs of the second and fifth stages are connected through their associated resistors 112-8 and 112-11, respectively, to the positive summing bus 114, while the uncomplemented Q outputs of these stages are connected through their associated resistors 112-2 and 112-5, respectively, to the negative summing bus 115.

Each of positive summing bus 114 and negative summing bus 115 are connected to an inverting −input 117a or 118a, respectively, of an associated respective one of a pair of differential operational amplifiers 117 or 118. The non-inverting +input 117b or 118b of each amplifier is connected through one of a pair of substantially identical-resistance elements 120a or 120b, respectively, to ground potential. The input-bias-current compensating resistors 120 have a value (R/6) where each of the six shift register output resistors 112 connected to the associated bus have a substantially-identical resistance value R. Each inverting input 117a or 118a is connected through a gain-setting resistance 122a or 122b, respectively, to the respective output 117c or 118c of the operational amplifier. The magnitude R' of resistors 122 is selected to establish the gain of the particular amplifying stage. The voltage $V_1$ at amplifier output 117c is given by the relationship $$V_1 = (R'/R)(V_{Q1} + V_{\overline{Q}2} + V_{Q3} + V_{Q4} + V_{\overline{Q}5} + V_{Q6}),$$

for the particular 2,5-chip complemented code establishing the particular connections from matched-filter means 108 illustrated. Similarly, the voltage $V_0$ at the other amplifier output 118c is given by the relationship $$V_0 = (R'/R)(V_{\overline{Q}1} + V_{Q2} + V_{\overline{Q}3} + V_{\overline{Q}4} + V_{Q5} + V_{\overline{Q}6}).$$

Each of the amplifier outputs 117c or 118c is coupled through an associated one of a pair of series resistances 124a or 124b, respectively, of substantially-equal magnitude $R_1$, to the associated non-inverting +input 126a or the associated inverting −input 126b of a third differential operational amplifier 126. Non-inverting input 126a is connected through a resistance element 128a to ground potential, while inverting input 126b is coupled through another resistance element 128b to the output 126c of that operational amplifier; each of resistors 128a and 128b are of substantially the same resistance $R_2$ magnitude. The third operational amplifier output 126c is connected to a first receiver means data output terminal 108b. The data output voltage $V_D$ at terminal 108b is given by the relationship $$V_D = (R_2/R_1)(V_1 - V_0).$$

Advantageously, output terminal 108b may also be coupled, as shown by broken line 129, to the data input 130a of a sample-and-hold means 130. Means 130 has a sampling control input 130b receiving the strobe STRB signal (from transmitter means 20) at terminal 82'. The strobe STRB signal, occurring during the sixth chip, samples the data output value and provides the sampled-and-held value at a means output 130c, connected to a sampled data output terminal 108b' of the receiver means.

Figure 3B:
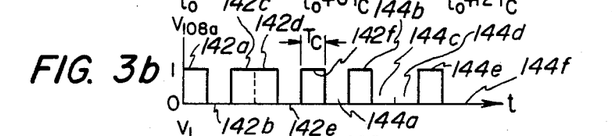

In operation, (and referring now to FIGS. 3b–3e in addition to block diagram FIG. 3), with a chip-complemented (e.g. chips 2 and 5 sent in complemented form) code word, receiver means matched-filter portion 108 functions as follows: whereas for the non-complemented-chip-encoded method, the demodulated data (FIG. 3a) is at a logic 1 level for all chips during a logic 1 bit BTI 140a, and is at logic 0 level for all chips during a logic 0 bit BTI 140b, the demodulated input data (FIG. 3b) is at a logic 1 level, unless jammed, only in the first, third, fourth and sixth chip portions 142a, 142c, 142d and 142f of a logic 1 bit BTI and at the logic 1 positions only during the second chip portion 144b and fifth chip portion 144e of a logic 0 bit BTI. During the second and fifth portions of the logic 1 bit BTI, the demodulated data input is at the logic 0 level, as in portions 142b and 142e, and is also at the logic 0 level during the first, third, fourth and sixth portions 144a, 144c, 144d and 144f of a logic 0 bit BTI.

After clearing of all six stages of register 110 responsive to the logic 1 chip reset signal at input 52', the portions 142a–142f are successively clocked into the first through sixth stages of this register. As each stage is filled with the proper data chip, the current summed to one of associated buses 114 or 115 increases, causing the associated positive bus operational amplifier output $V_1$ voltage to increase with a step-wise portion 146, until a maximum positive level 146a is reached during the sixth chip. Simultaneously, the remaining stage output currents are such that the output of the second operational amplifier 118 cannot decrease below a pre-established (e.g. zero voltage) level and the $V_0$ output voltage thereat remains substantially at this level, as in portion 148. Thus, the data output voltage $V_D$ at terminal 108b is a stair-case representation 146' of the first operational amplifier output voltage $V_1$ waveform 146; when the strobe STRB signal S occurs during the sixth chip, the sampled data output 108b' changes to a high positive value and is held thereat. The sampled data output value and the strobe STRB signal S can be used as the data and clock signals for subsequent recovered data processing.

Figure 3C:
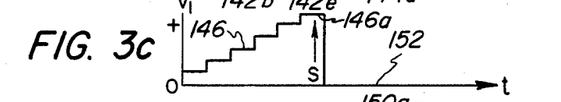
Figure 3D:
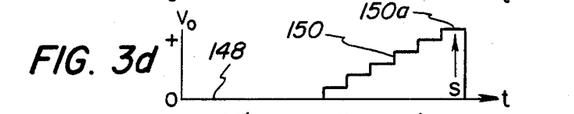
Figure 3E:
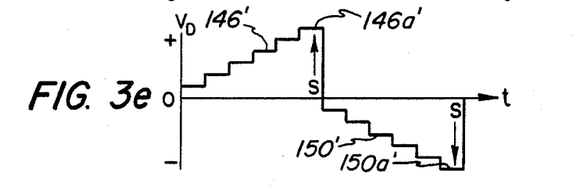

Similarly, for a received logic 0 bit with C=6 chips, the opposite outputs of the shift register cause the second operational amplifier output 118c to go positive and the voltage $V_0$ thereat to increase in a six-step-wise manner, in portion 150, until a maximum value 150a is reached in the sixth chip; simultaneously, the remaining stage outputs are such that the $V_1$ voltage at first operational amplifier output 117c cannot decrease below its lower (e.g. zero voltage) limit, as in portion 152 of FIG. 3c. The combined data output terminal 108b voltage $V_D$ is the inversion of the second operational amplifier voltage $V_0$ and thus decreases in a six-step portion 150' (which is the inverse of portion 150) until a maximum negative voltage is reached at sixth step portion 150a'. The next strobe STRB pulse S appears during this sixth step, sampling the data at output 108b and providing this held data at sample data output 108b', so that a fully-recovered logic 0 bit signal provides a maximum negative output value (with respect to the maximum positive output value provided at terminal 108b' for a fully-recovered logic 1 received data bit). It will be seen that if any one of the C chips is received with an improper binary value, a change in the data output voltage does not occur (either in the positive direction for a logic 1 bit chip being received or the negative direction for a logic 0 bit chip being received) and the maximum positive value for a logic 1 bit or the maximum negative value for a logic 0 bit is not as great at the time that strobe S occurs, as if all C chips are properly received. However, even if several chips are lost, reception of at least one proper chip per BTI will provide a non-zero data output $V_D$ voltage, which still indicates the proper binary value of the bit in that BTI. The decision between reception of a binary 0 and binary 1 logic bit can be further determined by the use of a subsequent comparator (not shown) having a zero voltage threshold, so that any positive voltage step is interpreted as a binary logic 1 data bit and any negative voltage step is interpreted as a binary logic 0 data bit, if required by the subsequent data processing portions of each data system station.

While several embodiments of my novel method of, and apparatus for, transmission of digital data have been described in detail herein, many variations and modifications will now become apparent to those skilled in the art. It is my intent, to be limited only by the scope of the appending claims, and not by the details and instrumentalities presented by way of explanatory example herein.

What I claim is:

1. A method for the transmission of digital data, comprising the steps of:
   (a) assigning one of a plurality of sequential bit time intervals (BTIs) for the transmission of an associated bit of data in a sequential stream of a like plurality of digital data bits;
   (b) separating each BTI into the same number of a sequential plurality C, where C is an integer greater than 1, of successive chip time intervals (CTIs);
   (c) designating a plurality N, wherein N is an integer greater than 1, of known nominal signal frequencies for transmission of data;
   (d) substantially permanently assigning a predeterminately-selected, and different, one of the plurality N of known nominal transmission frequencies for utilization during each associated and like-positioned one of the plurality C of chip time intervals and with the same sequence of C frequencies for all BTIs; and (e) transmitting a signal with an output frequency which differs from the associated known nominal transmission frequency of each sequential CTI of that particular BTI by an offset frequency responsive to that one data value, of a plurality of possible digital data values, to be transmitted in a particular BTI.

2. The method of claim 1, wherein there are C=6 CTIs during each BTI.

3. The method of claim 1, wherein step (b) further includes the step of: setting the number of CTIs in each BTI to be less than the number N of the plurality of nominal signal frequencies.

4. The method of claim 3, wherein step (d) includes the steps of: assigning a different known nominal signal frequency to each different associated CTI; and utilizing the same known sequence of nominal signal frequencies for the same CTI sequence of each BTI.

5. The method of claim 1, wherein step (c) includes the step of: assigning each of the plurality N of nominal known signal frequencies to have substantially equal frequency separation from adjacent predeterminately-known nominal signal frequencies.

6. The method of claim 5, wherein step (e) includes the step of: selecting the separation between adjacent predeterminately-known nominal signal frequencies to be greater than the separation between adjacent offset frequencies.

7. The method of claim 6, wherein the ditigal data is binary digital data having either a logic zero value or a logic one value, and step (e) further includes the steps of: offsetting the nominal signal frequency during each CTI in a first frequency direction for the logic zero value; and offsetting the nominal signal frequency during each CTI in a second frequency direction, opposite to the first frequency direction, for the logic one value.

8. The method of claim 7, wherein step (e) further includes the steps of: offsetting the nominal signal frequency in an increasing frequency direction during each CTI of a BTI in which a binary 1 data value is transmitted; and offsetting the nominal signal frequency in a decreasing frequency direction during each CTI of a BTI in which a binary 0 data value is transmitted.

9. The method of claim 1, wherein step (b) includes the step of: separating each BTI into the same integer number of CTIs; and further comprising the step of: (f) complementing the offset frequency direction of selected ones of the plurality C of chip time intervals during each BTI.

10. The method of claim 9, including the step of: complementing the offset frequency direction of the same selected ones of chip time intervals in each of the successive plurality of BTIs.

11. The method of claim 10, wherein the digital data is binary digital data, and step (e) further includes the steps of: offsetting the nominal signal frequency during each non-selected CTI in a first frequency direction and offsetting the nominal signal frequency during each selected CTI in a second frequency direction, opposite to the first frequency direction, for a first binary data value; and offsetting the nominal signal frequency during each non-selected CTI in the second frequency direction and offsetting the nominal signal frequency during each selected CTI in the first frequency direction for the remaining binary data value.

12. The method of claim 11, wherein step (e) further includes the steps of: offsetting the nominal signal frequency in an increasing frequency direction during each non-selected CTI of a BTI in which a binary 1 data value is transmitted; offsetting the nominal signal frequency in a decreasing frequency direction during each non-selected CTI of a BTI during which a binary 0 data value is transmitted; offsetting the nominal signal frequency during each selected, complemented CTI in a decreasing frequency direction for a binary 1 data value BTI; and offsetting the nominal signal frequency during each selected, complemented CTI in an increasing frequency direction for a binary 0 data value BTI.

13. The method of claim 12, further including the steps of: utilizing C=6 CTIs in each BTI; and complementing the offset frequencies in the second and fifth CTIs of each BTI.

14. The method of claim 1, further comprising the steps of: (g) transmitting, over a system transmission medium, the signal output frequency during each CTI; (h) receiving the signal output frequency transmissions at a receiving means coupled to the system transmission medium; and (i) recovering the digital data values from the actual frequencies of the transmissions received at the receiving end.

15. The method of claim 14, wherein step (h) includes the step of: coupling the actual signal frequencies from the transmission medium; converting the received actual signal frequencies to a signal with a predetermined intermediate-frequency range; and frequency demodulating the intermediate-frequency signal to recover the digital data value of each signal received from the transmission medium.

16. The method of claim 15, wherein the received signal converting step comprises the steps of: generating a local oscillator signal at that one of a like plurality N of local oscillator frequencies, each related by the intermediate frequency to the predeterminately-known nominal frequency to be transmitted during each CTI in the sequence selected for each BTI; and changing the actual signal frequency, as recieved, by the generated local oscillator signal frequency to provide the intermediate-frequency signal.

17. The method of claim 15, further comprising the step of: processing the frequency-demodulated digital data values in a filter matched to the particular predeterminately-selected sequence of CTI codings to maximize the recovered data value signal and minimize effects of any potentially-interferring signals present upon said transmission medium.

18. The method of claim 17, further comprising the step of: synchronizing the demodulated signal processing in the matched filter to the CTI sequence utilized during the digital data transmissions.

19. The method of claim 18, further comprising the step of: sampling the filtered signal during the last CTI of each BTI to provide the recovered digital data value output.

20. The method of claim 18, further comprising the step of: providing each data signal receiving means with a CTI-synchronizing signal from a means, associated with that receiving means, for transmitting a digital data signal over the transmission medium.

21. Apparatus for digital data communications over a transmissions medium, comprising:
(I) at least one transmitter means for providing a data transmission signal to said transmission medium, each transmitter means including:
(a) means for assigning one of a plurality of sequential bit time intervals (BTIs) for the transmission of an associated bit of data in a sequential stream of a like plurality of digital data bits;
(b) means for separating each BTI into a sequential plurality C of the same number of successive chip time intervals (CTIs);
(c) means for generating an instantaneous transmission signal frequency within a predetermined frequency range;
(d) means for designating a plurality N of known nominal signal frequencies, within said preselected frequency range, for data transmission;
(e) means for substantially permanently assigning a predetermined different one of the plurality N of known nominal transmission frequencies designated by said designating means (1d) for utilization during each associated one of the plurality C of chip time intervals and with the same sequence of C frequencies for all BTIs;
(f) means for designating an offset frequency; responsive to the particular one of a plurality of digital data values to be transmitted in a particular BTI, for modification of the nominal transmission frequency assigned by said assigned means, (1e) to cause said generating means to provide an output signal frequency for coupling to said transmission medium during each sequential CTI of each particular BTI; and
(II) at least one receiver means coupled to said transmission medium for recovering the digital data value of each actual frequency signal received from said medium.

22. The apparatus of claim 21, wherein each of said at least one transmitter means further includes means for complementing the offset frequency during predeterminately-selected ones of said plurality C of chip time intervals during each BTI; and each of said at least one receiver means is adapted to recover the digital data value of actual frequency signal sequences including said complemented offset frequency chips.

23. The apparatus of claim 21, wherein said frequency generating means (Ic) comprises voltage-controlled oscillator means for generating an output signal having said instantaneous signal frequency responsive to the magnitude of a frequency-control signal received at a control input thereof.

24. The apparatus of claim 23, wherein each frequency generating means further includes means for amplifying the voltage-controlled oscillator means output signal prior to coupling of that signal to said transmission medium.

25. The apparatus of claim 24, wherein said amplifying means is controlled to operate only during data transmission from the particular transmitter means of which the particular amplifying means is a part.

26. The apparatus of claim 23, wherein said nominal frequency designating means (Id) includes: means for establishing the magnitude of a reference signal; and converter means, having a plurality of inputs each receiving one of a plurality of signal levels, for providing the control signal to said oscillator means control input with a magnitude responsive to both the reference signal magnitude and to the pattern of levels then present at said plurality of converter means inputs.

27. The apparatus of claim 26, wherein at least one of said converter means inputs receives a signal having a change predetermined one of said levels only if the associated transmitter means is enabled to provide said data transmission signal to said transmission medium.

28. The apparatus of claim 26, further comprising: data input means for receiving each of a sequence of digital data values to be transmitted; and means for changing the signal level at at least one other one of the plurality of inputs of said converter means responsive to the digital data value then present at said data input means.

29. The apparatus of claim 26, wherein said nominal frequency assigning means (Ie) comprises means, having a plurality of inputs equal to the plurality C of chip time intervals and a plurality of outputs each coupled to a different one of the converter means inputs, for providing a different combination of converter means input levels responsive to enablement of each different one of the like plurality C of assigning means inputs.

30. The apparatus of claim 29, wherein said separating means (Ib) includes: serial shift register means having a plurality of stages equal in number to the plurality C of chip time intervals in each BTI, each stage having an output connected to a single associated input of said nominal frequency assigning means, and an input receiving a periodic enabling signal at a frequency proportional to the number C of register stages and adversely proportional to the duration of each BTI; and means for setting or resetting each stage to cause the stage output to be sequentially and singly enabled in continuous, cyclic manner at a rate determined by said enabling signal.

31. The apparatus of claim 30, further comprising means coupled between said separating means and said offset frequency designating means for complementing the offset frequency designated during each of a selected number of CTIs in each BTI.

32. The apparatus of claim 31, wherein said complementing means comprises: means for storing the data value to be transmitted during the present BTI; means for complementing the stored present-BTI digital data value; means receiving the output of each shift register stage for providing a first signal whenever a non-selected CTI is occurring and a second signal whenever a selected CTI is occurring; and gating means for coupling the stored data value to said offset frequency designating means responsive to the presence of said first signal and for coupling said complemented present-BTI data value signal to said offset frequency designating means whenever said second signal is present.

33. The apparatus of claim 21, wherein each of said at least one receiver means comprises: means for generating, during each CTI, a local oscillator signal at that one of a like plurality N of frequencies, each related by an intermediate frequency to the predeterminately-known nominal frequency to be transmitted during that CTI in the known sequence selected by said separating means (Ib) for each BTI; means for changing the received signal frequency by the generated local oscillator signal frequency to provide an intermediate-frequency signal; and means for frequency-demodulating the intermediate-frequency signal to recover the digital data value state in at least one CTI of each BTI.

34. The apparatus of claim 33, wherein each receiver means is associated with a transmitter means, and said local oscillator frequency generating means includes: means for acting upon said frequency generating means (Ic) and said frequency designating means (Id) for modifying the instantaneous frequency thereof to said local oscillator frequency; and gating means for switching the output of said frequency generating means (Ic) to said receiver means when the associated transmitter means is not actively providing a data transmission signal to said transmission medium.

35. The apparatus of claim 33, further comprising: single matched-filter means receiving said frequency-demodulated signal for maximizing the recovered digital data signal and for minimizing effects of an potentially-interfering signals present upon said transmission medium.

36. The apparatus of claim 35, wherein said matched-filter means is synchronized to operate during each CTI during each BTI of a digital data transmission.

37. The apparatus of claim 35, wherein said matched-filter means comprises: a shift register having a plurality of stages equal in number to the plurality C of CTIs utilized for each BTI, each stage having an uncomplemented output and a complemented output; first and second signal buses; a plurality 2C of resistive elements, each coupled in a known pattern between a different one of the pair of outputs of each different shift register stage and a different one of said signal buses; and amplifier means receiving the summation of signals on each said first and second buses for providing an output signal increasing with each CTI of a particular BTI if the proper complemented sequence is received.

38. The apparatus of claim 37, further comprising means for sampling the output signal of said amplifier means during the last CTI of each BTI to provide the recovered digital data value at a receiver means data output.

* * * * *